United States Patent
Ide et al.

(10) Patent No.: US 8,440,029 B2
(45) Date of Patent: May 14, 2013

(54) STAINLESS STEEL HAVING GOOD CONDUCTIVITY AND DUCTILITY FOR USE IN FUEL CELL AND METHOD FOR PRODUCING THE SAME

(75) Inventors: Shinsuke Ide, Tokyo (JP); Atsutaka Honda, Tokyo (JP); Shin Ishikawa, Tokyo (JP); Takumi Ujiro, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/387,506

(22) PCT Filed: Jul. 26, 2010

(86) PCT No.: PCT/JP2010/062975
§ 371 (c)(1),
(2), (4) Date: Jan. 27, 2012

(87) PCT Pub. No.: WO2011/013832
PCT Pub. Date: Feb. 3, 2011

(65) Prior Publication Data
US 2012/0118442 A1 May 17, 2012

(30) Foreign Application Priority Data
Jul. 30, 2009 (JP) ................ 2009-177814

(51) Int. Cl.
*C21D 8/02* (2006.01)
*C22C 38/26* (2006.01)
*C22C 38/28* (2006.01)

(52) U.S. Cl.
USPC ............ 148/326; 148/325; 148/608; 148/610

(58) Field of Classification Search .................. 148/325, 148/326, 607, 608, 610, 648–658
See application file for complete search history.

(56) References Cited

U.S. PATENT DOCUMENTS

| | | | |
|---|---|---|---|
| 2003/0124019 A1* | 7/2003 | Grubb | 420/68 |
| 2004/0050462 A1* | 3/2004 | Grubb | 148/607 |
| 2006/0105218 A1 | 5/2006 | Ishikawa et al. | |

FOREIGN PATENT DOCUMENTS

| | | |
|---|---|---|
| EP | 1235290 A2 | 8/2002 |
| EP | 1484424 A1 | 12/2004 |
| EP | 1717329 A1 | 11/2006 |

(Continued)

OTHER PUBLICATIONS

International Search Report dated Oct. 26, 2010, application No. PCT/JP2010/062975.

(Continued)

*Primary Examiner* — Deborah Yee
(74) *Attorney, Agent, or Firm* — RatnerPrestia

(57) ABSTRACT

A stainless steel having good conductivity and ductility for use in a fuel cell separator is provided. In particular, the stainless steel has a composition of, in terms of % by mass, C: 0.01% or less, Si: 1.0% or less, Mn: 1.0% or less, S: 0.01% or less, P: 0.05% or less, Al: 0.20% or less, N: 0.02% or less, Cr: 20 to 40%, Mo: 4.0% or less, and at least one selected from Nb, Ti, and Zr: 0.05 to 0.60% in total, the balance being Fe and unavoidable impurities. At least one precipitate having an equivalent circle diameter of 0.1 μm or more is present per 100 μm², a ratio of a thickness t (μm) to a maximum diameter Dmax (μm) of the precipitates satisfies formula (1) below $$20 \leq t/Dmax \qquad (1)$$

and the thickness is 200 μm or less.

2 Claims, 2 Drawing Sheets

FOREIGN PATENT DOCUMENTS

| | | |
|---|---|---|
| EP | 1726674 A1 | 11/2006 |
| JP | 5-331551 A | 12/1993 |
| JP | 7-126812 | 5/1995 |
| JP | 227999 A | 9/1997 |
| JP | 2005-166276 A | 6/2005 |
| JP | 2005-302713 A | 10/2005 |
| JP | 2006-233282 A | 9/2006 |
| JP | 2007-254794 | 10/2007 |
| JP | 2008-285731 A | 11/2008 |
| JP | 2008-303436 A | 12/2008 |
| WO | WO2008/156195 A1 | 12/2008 |

OTHER PUBLICATIONS

Supplementary European Search Report dated Jan. 28, 2013, application No. EP10804578.

* cited by examiner

STAINLESS STEEL HAVING GOOD CONDUCTIVITY AND DUCTILITY FOR USE IN FUEL CELL AND METHOD FOR PRODUCING THE SAME

CROSS REFERENCE TO RELATED APPLICATIONS

This application is the U.S. National Phase application of PCT International Application No. PCT/JP2010/062975, filed Jul. 26, 2010, and claims priority to Japanese Patent Application No. 2009-177814, filed Jul. 30, 2009, the disclosures of which are incorporated herein by reference in their entireties for all purposes.

FIELD OF THE INVENTION

The present invention relates to stainless steel having good conductivity and ductility for use in a fuel cell.

BACKGROUND OF THE INVENTION

In recent years, development of fuel cells that offer high power generation efficiency and emit no carbon dioxide has been promoted from the viewpoint of preserving the global environment. A fuel cell is a device that generates power by causing hydrogen and oxygen to react with each other. A basic structure of a fuel cell resembles a sandwich and is constituted by an electrolyte membrane (i.e., ion exchange membrane), two electrodes (i.e., a fuel electrode and an air electrode), a diffusion layer for diffusing hydrogen and oxygen (air), and two separators. Phosphoric-acid fuel cells, molten carbonate fuel cells, solid-oxide fuel cells, alkaline fuel cells, proton-exchange membrane fuel cells, and the like have been developed in accordance with the type of electrolyte used.

Of these fuel cells, proton-exchange membrane fuel cells in particular have following advantages over molten carbonate fuel cells, phosphoric-acid fuel cells, and the like:
(a) Operation temperature is significantly low, i.e., about 80° C.
(b) Weight- and size-reduction of the fuel cell main body is possible.
(c) The time taken for start-up is short and fuel efficiency and output density are high.

Accordingly, proton-exchange membrane fuel cells are one of the most prospective fuel cells for onboard power supplies for electric vehicles and portable and compact dispersed power systems for household use (stationary type compact electric generator).

A proton-exchange membrane fuel cell is based on the principle of extracting power from hydrogen and oxygen through a polymer membrane has a structure shown in FIG. 1, in which a membrane-electrode assembly 1 is sandwiched by gas diffusion layers 2 and 3 such as carbon cloths and separators 4 and 5 to form a single constitutional element (also known as a single cell). Electromotive force is generated between the separators 4 and 5.

The membrane-electrode assembly 1 is also known as MEA and is made by integrating a polymer membrane and an electrode material such as carbon black supporting a platinum catalyst, the electrode material being provided on front and back surfaces of the polymer membrane. The thickness of the membrane-electrode assembly 1 is several ten to several hundred micrometers. The gas diffusion layers 2 and 3 are frequently integrated with the membrane-electrode assembly 1.

When proton-exchange membrane fuel cells are applied to the usages described above, several ten to several hundred single cells described above are connected in series to form a fuel cell stack, and the fuel cell stack is used.

The separators 4 and 5 typically have the following functions:
(A) a function of a separator that separates between single cells;
(B) a function of a conductor that carries electrons generated;
(C) a function of a channel for oxygen (air) and hydrogen (air channels 6 and hydrogen channels 7 in FIG. 1); and
(D) a function of a discharge channel for discharging water and gas generated (air channels 6 and hydrogen channels 7 also serve as this discharge channel).

In order to use a proton-exchange membrane fuel cell in practical application, separators having good durability and conductivity must be used.

The durability expected is about 5000 hours for fuel cells for electric vehicles and about 4000 hours for stationary type electric generators used as compact dispersed power systems for household use and the like.

Proton-exchange membrane fuel cells that have been put to practice use carbon materials as separators. However, since carbon separators are susceptible to fracture upon impact, not only the size-reduction is difficult but also the process cost for forming channels is high. In particular, the cost problem has been the largest impediment for spread of fuel cells.

In response, attempts have been made to use a metal material, in particular, stainless steel, instead of carbon materials as the material for separators.

As discussed earlier, separators have a function of a conductor for carrying electrons generated and must have conductivity. With respect to the conductivity in the cases where stainless steel is used as separators, the contact resistance between the separators and gas diffusion layers becomes dominant. Thus, a technique for reducing the contact resistance has been pursued.

For example, PTL 1 discloses stainless steel including $10^{11}$ laves phases having a grain diameter of 0.3 μm or more in a surface per square meter.

PATENT LITERATURE

PTL 1: Japanese Unexamined Patent Application Publication No. 2007-254794

SUMMARY OF THE INVENTION

Although the technique disclosed in PTL 1 is effective in reducing the contact resistance, it requires a long aging treatment and the productivity has been low. Moreover, precipitates such as those described above precipitated by the long aging treatment are coarse and their effect on ductility has not been addressed. Thus, processability (or workability) required for separators has not been satisfied.

This invention addresses the problem of the related art described above and provides stainless steel having good conductivity and ductility for use in fuel cell separators. A production method therefor is also provided.

The inventors have extensively studied the effects of precipitates on conductivity and ductility.

As a result, they have found that good conductivity can be obtained by allowing not only the laves phases ($A_2B$ where A represents Fe, Cr, Si, or the like and B represents Nb, Mo, W, or the like) but also precipitates of a particular size containing intermetallics such as sigma phases, chi phases, and mu phases, carbides, nitrides, carbonitrides, and a mixture thereof to exist at a particular distribution density.

They have also found that the ductility decreases significantly when the ratio of the maximum diameter of the precipitates to the thickness is a particular value or more. This is contrary to a conventional decrease in ductility caused by grain dispersion hardening and means that fracture is likely to occur due to the difference in plastic deformation behavior between the precipitates and the parent phase when coarse precipitates not contributing to the hardening are present and the ratio of the precipitates with respect to the thickness is large.

These findings indicate that according to a technique of maintaining the conductivity by using precipitates, it is advantageous for separators that frequently use thin stainless steel sheets to have intermetallics, carbides, nitrides, carbonitrides, and a mixture thereof precipitated to an extent that does not decrease the ductility.

The present invention has been made based on these findings.

The summary of the present invention according to exemplary embodiments is as follows:

(1) A stainless steel for use in a fuel cell separator, the stainless steel having a composition of, in terms of % by mass, C: 0.01% or less, Si: 1.0% or less, Mn: 1.0% or less, S: 0.01% or less, P: 0.05% or less, Al: 0.20% or less, N: 0.02% or less, Cr: 20 to 40%, Mo: 4.0% or less, and at least one selected from Nb, Ti, and Zr: 0.05 to 0.60% in total, the balance being Fe and unavoidable impurities, in which at least one precipitate having an equivalent circle diameter of 0.1 μm or more is present per 100 μm$^2$, a ratio of a thickness t (μm) to a maximum diameter Dmax (μm) of the precipitates satisfies formula (1) below $$20 \leq t/Dmax \quad (1)$$

and the thickness is 200 μm or less.

The precipitates referred to in the description include not only laves phases ($A_2B$ where A represents Fe, Cr, Si, or the like and B represents Nb, Mo, W, or the like) but also intermetallics such as sigma phases, chi phases, and mu phases, carbides, nitrides, carbonitrides, and mixtures thereof.

(2) A method for producing stainless steel for use in a fuel cell separator, the method comprising cooling a stainless steel cold-rolled sheet by controlling a cooling rate R (° C./s) relative to a thickness t (μm) at least down to 500° C. after annealing so that the cooling rate R satisfies formula (2) below, the stainless steel cold-rolled sheet having a thickness of 200 μm or less and having a composition of, in terms of % by mass, C: 0.01% or less, Si: 1.0% or less, Mn: 1.0% or less, S: 0.01% or less, P: 0.05% or less, Al: 0.20% or less, N: 0.02% or less, Cr: 20 to 40%, Mo: 4.0% or less, and at least one selected from Nb, Ti, and Zr: 0.05 to 0.60% in total, the balance being Fe and unavoidable impurities:

$$-17.27 \times \ln(t) + 92 \leq R \leq 70 \quad (2)$$

According to the present invention, stainless steel having good conductivity and ductility for use in a fuel cell separator can be stably obtained.

DETAILED DESCRIPTION OF EMBODIMENTS OF THE INVENTION

Figure 1:
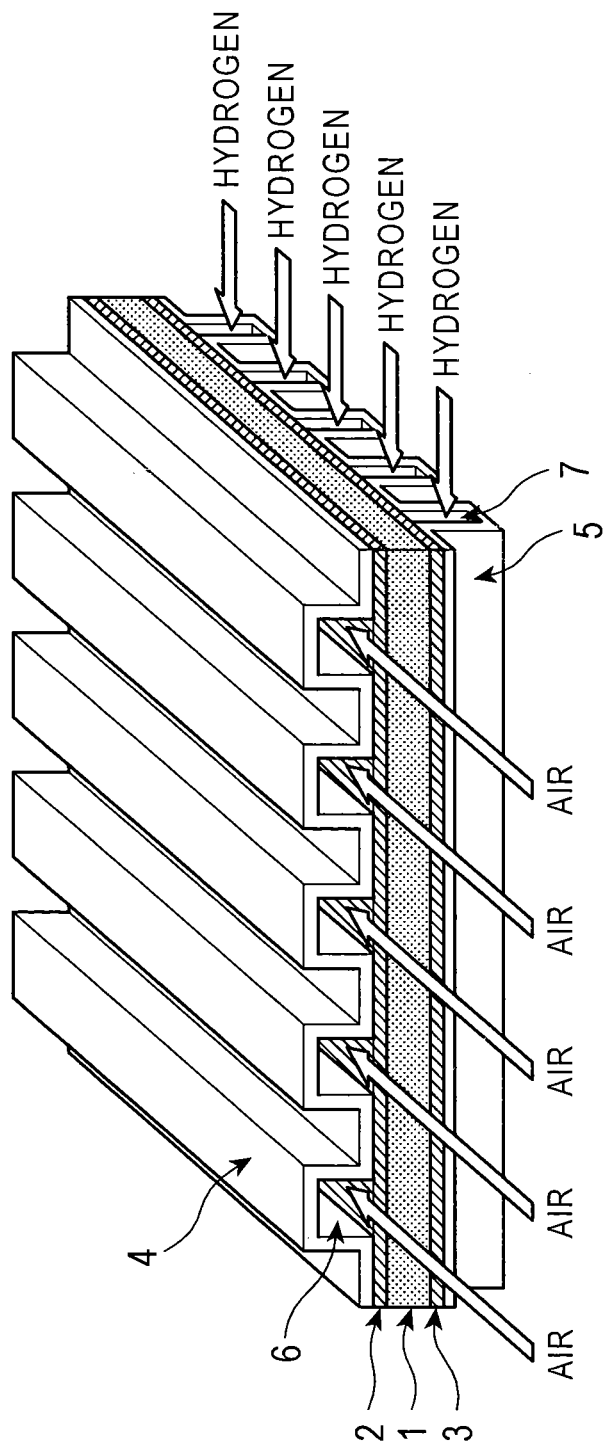
FIG. 1 is a schematic view showing a basic structure of an embodiment of a fuel cell.

The present invention will now be specifically described according to exemplary embodiments.

According to preferred embodiments of the present invention, stainless steel used as a base material of a fuel cell separator maintains conductivity by using precipitates. Thus, it is advantageous to have intermetallics, carbides, nitrides, carbonitrides, and a mixture thereof precipitated to an extent that does not decrease the ductility. In order achieve this goal, a ferritic stainless steel with which morphology of precipitates is easy to control is preferable.

First, the reason why the composition of the ferritic stainless steel, i.e., the raw material, is preferably limited to the range described above in the present invention is described. Note that "%" regarding components indicates % by mass unless otherwise noted.

C: 0.01% or less

Carbon bonds to Cr in the steel and decreases the corrosion resistance and thus the C content is preferably as low as possible. The corrosion resistance is not significantly decreased as long as the carbon content is 0.01% or less. Accordingly, in embodiments of the present invention, the C content is limited to 0.01% or less. Although carbon bonds to at least one of Nb, Ti, and Zr described below to form carbides, carbonitrides, and mixtures thereof and improves conductivity, such an effect is exhibited as long as the C content is 0.001% or more, which is the decarburization limit level for mass production scale. Thus the lower limit for the C content is not set.

Si: 1.0% or less

Silicon is an element used in deoxidation but decreases the ductility when contained in an excessively large amount. Thus, the Si content is limited to 1.0% or less and preferably 0.5% or less.

Mn: 1.0% or less

Manganese bonds to S to form MnS and decreases the corrosion resistance. Thus, the Mn content is limited to 1.0% or less and preferably 0.8% or less.

S: 0.01% or less

As described above, S bonds to Mn to form MnS and decreases corrosion resistance. Thus the S content is limited to 0.01% or less and preferably 0.008% or less.

P: 0.05% or less

Phosphorus decreases the ductility and the P content is thus as low as possible. The ductility is not significantly decreases as long as the P content is 0.05% or less. Thus, the P content is limited to 0.05% or less and preferably 0.04% or less.

Al: 0.20% or less

Aluminum is an element used in deoxidation but decreases the ductility when contained in an excessively large amount. Thus, the Al content is limited to 0.20% or less and preferably 0.15% or less.

N: 0.02% or less

Nitrogen bonds to Cr in the steel and decreases the corrosion resistance and thus the N content is preferably as low as possible. The corrosion resistance is not significantly decreased as long as the N content is 0.02% or less. Thus, the N content is limited to 0.02% or less and preferably 0.015% or less. Although nitrogen bonds to at least one of Nb, Ti, and Zr described below to form nitrides, carbonitrides, or a mixture thereof and improves conductivity, such an effect is exhibited as long as the N content is 0.002% or more, which is the denitrification limit level for mass production scale. Thus the lower limit for the S content is not set.

Cr: 20 to 40%

Chromium is an essential element for maintaining the corrosion resistance of stainless steel and sufficient corrosion resistance is not obtained at a Cr content less than 20%.

However, the ductility decreases when the Cr content exceeds 40%. Thus, the Cr content is limited in the range of 20 to 40% and preferably 24 to 35%.

Mo: 4.0% or less

Molybdenum is an element effective for improving the corrosion resistance, in particular, local corrosion resistance, of stainless steel. In order to achieve this effect, 0.02% or more of Mo is preferably added. However, since the ductility decreases when the Mo content exceeds 4.0%, the Mo content is limited to 4.0% or less and preferably 2.0% or less.

At least one selected from Nb, Ti, and Zr, in total: 0.05 to 0.60%

All of Nb, Ti, and Zr are useful elements that improve the conductivity by forming carbides, nitrides, carbonitrides, a mixture thereof, or intermetallics. However, when its content is less than 0.05%, such an effect is not fully exhibited. In contrast, when the content exceeds 0.60%, the ductility is decreased. The content of these elements whether added alone or in combination is thus limited in the range of 0.05 to 0.60% and preferably 0.10 to 0.50%.

In the present invention, 1% or less of each of Ni, Cu, V, W, Ta, and Co may be contained to improve the corrosion resistance and 0.1% or less of Ca, Mg, REM (Rare Earth Metals), and B each may be contained to improve hot workability.

Elements other than those described above are the balance Fe and unavoidable impurities. Of the unavoidable impurities, oxygen (O) is preferably contained in an amount of 0.02% or less.

Although the composition of the components is described above, in the present invention, it may not be sufficient that the composition satisfies the above-described ranges. The size and distribution density of the precipitates are advantageously controlled.

Type of Precipitates:

Precipitates include not only laves phases ($A_2B$ where A represents Fe, Cr, Si, or the like and B represents Nb, Mo, W, or the like) but also other intermetallics such as sigma phases, chi phases, and mu phases, carbides, nitrides, carbonitrides, and a mixture thereof.

At least one precipitate having an equivalent circle diameter of 0.1 μm or more is present per 100 $\mu m^2$.

Controlling the distribution density of precipitates having a particular size or more is a technique that forms the basis of the present invention in maintaining the conductivity. Of the precipitates, those having an equivalent circle diameter less than 0.1 μm do not contribute to improving the conductivity and thus precipitates having an equivalent circle diameter of 0.1 or more are chosen as the subject to be controlled. When the number of precipitates of this size is less than 1 per 100 $\mu m^2$, the conductivity is deficient. Thus, the number is 1 or more and preferably 3 or more per 100 $\mu m^2$.

Ratio of the thickness t (μm) to maximum diameter Dmax (μm) of precipitates: $20 \leq t/Dmax$ Controlling the maximum diameter Dmax of the precipitates relative to the thickness t to avoid adverse effects on ductility is beneficial for the present invention. When t/Dmax is less than 20, voids created by the difference in plastic deformation behavior between the precipitates and the parent phase easily cause fracture, thereby significantly decreasing the ductility. Accordingly, in the present invention, Dmax is advantageously limited to $20 \leq t/Dmax$ and preferably $25 \leq t/Dmax$.

Next, an embodiment of a method for producing stainless steel of the present invention is described.

The production method up to production of stainless steel cold-rolled sheets is not particularly limited and any known method for ferritic stainless steel may be employed. Preferable production conditions are as follows.

A slab having a composition adjusted within the preferable ranges described above is heated to a temperature of 1150° C. or more, hot-rolled, annealed at a temperature of 1000 to 1100° C., and cold-rolled.

As a result, a stainless steel sheet having a thickness of 200 μm or less is formed.

In the present invention, the thickness of the stainless steel is preferably limited to 200 μm or less for the following reason. At a thickness exceeding 200 μm, fracture caused by the difference in plastic deformation behavior between the precipitates and the parent phase does not easily occur. The thickness is preferably 200 μm or less since when the sheet is used as a part of a fuel cell, weight- and size-reduction can be achieved.

Next, the cold-rolled sheet is annealed in a temperature range of 950 to 1100° C. and cooled. In the present invention, controlling the cooling rate R (° C./s) down to at least 500° C. in the range of $-17.27 \times \ln(t)+92 \leq R \leq 70$ is advantageous for controlling the ratio t/Dmax and precipitates having a particular size or more.

The starting point for calculating the cooling rate is 950° C. This is because, according to the composition range of the present invention, the temperature range in which the amount of precipitates increases significantly is less than 950° C. When the cooling rate R is low, not only Dmax is increased but also the distribution density of precipitates having a particular size or more is decreased. In other words, when the thickness t is larger, the upper limit for Dmax is also large, which decreases the lower limit for R. The opposite will occur when t is smaller.

Figure 2:
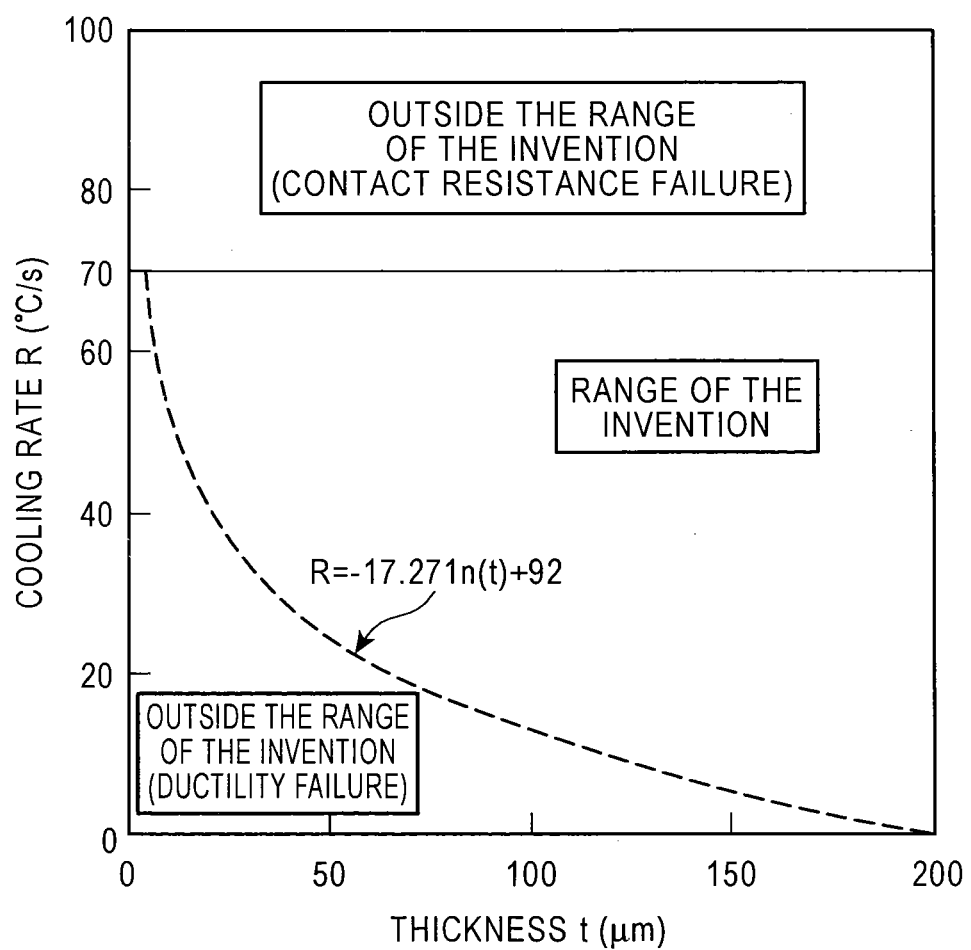
FIG. 2 is a graph showing an effect of a cooling rate on ductility of stainless steel.

FIG. 2 shows the results of studies on the influence of the cooling rate on the ductility of the stainless steel sheet relative to the thickness t (μm).

The graph shows that good ductility can be achieved as long as the cooling rate R is $(-17.27 \times \ln(t)+92)°$ C./s or more. When R exceeds 70° C./s, the precipitate distribution density needed to maintain the conductivity cannot be obtained.

Accordingly, in embodiments of the present invention, the cooling rate R (° C./s) down to at least 500° C. is limited to $-17.27 \times \ln(t)+92 \leq R \leq 70$ with respect to the thickness t (μm).

The state of the precipitates is determined solely by R because, in the composition range of the present invention, whereas the temperature range in which the amount of precipitates increases significantly is less than 950° C., the preferable range of the annealing temperature is 950° C. or more, and thus most of the precipitates occur in the cooling process.

Furthermore, in the present invention, the contact resistance is preferably decreased by performing an electrolytic treatment, an acid immersion treatment, or the like after the cooling process described above. The electrolytic treatment, the acid immersion treatment, or the like may be performed before, after, or in the middle of a part processing step.

Example 1

A steel having a chemical composition shown in Table 1 was melted in a vacuum melting furnace and formed into steel ingots. The steel ingots were heated to 1150° C. or more and hot-rolled to form hot rolled sheets having a thickness of 5 mm. The hot rolled sheets were annealed at 1000 to 1100° C. and pickled to remove scales. Subsequently, cold-rolling, annealing, and pickling were repeated to form cold-rolled annealed sheets having a thickness of 50 μm or 100 μm. The resulting cold-rolled sheets were retained at a temperature of 1000 to 1050° C. for 1 minute and cooled at 5° C./s, 20° C./s, 50° C./s, or 100° C./s down to 500° C. For comparison, some of the cold-rolled annealed sheets were subjected to an aging treatment for 10 hours at 800° C. as in PTL 1.

The resulting cold-rolled annealed sheets were de-scaled in an aqueous sodium sulfuric acid solution (1.4 mol/l) at 80° C. by anodic electrolysis at 6 A/dm$^2$ for 60 seconds and subjected to anodic electrolysis at 5 A/dm$^2$ for 60 seconds in a 5 mass % sulfuric acid at 80° C. to expose surfaces of the precipitates. The results of studies on t/Dmax, the distribution density of precipitates having an equivalent circle diameter of 0.1 μm or more, the contact resistance, and the total elongation of the stainless steel sheets obtained thereby are shown in Tables 2-1 and 2-2.

Methods for measuring Dmax, the distribution density of precipitates having an equivalent circle diameter of 0.1 μm or more, the contact resistance, and the total elongation are as follows:

Dmax and distribution density of precipitates having an equivalent circle diameter of 0.1 μm or more A surface of stainless steel was observed with a scanning electron microscope and twenty views of ×20,000 photographs were arbitrarily taken from each sample. The equivalent circle diameter of each grain of precipitates (intermetallics, carbides, nitrides, carbonitrides, and a mixture of these) photographed in the picture was measured, and the number of grains having an equivalent circle diameter of 0.1 μm or more was counted to determine the distribution density per 100 μm$^2$. The equivalent circle diameter of the largest precipitate among these was defined as Dmax. Oxides such as deoxidation products are not included in the precipitates. Identification of precipitates was done by using an energy-dispersive X-ray spectroscope which is an auxiliary device of the scanning electron microscope.

Contact Resistance

Two stainless steel sheets (50 mm×50 mm) produced under the same conditions were taken from each sample and alternately sandwiched between three carbon paper sheets (50 mm×50 mm TGP•H•120 produced by Toray Industries, Inc.). The resulting stack was brought into contact with electrodes formed of gold-plated copper sheets from both sides of the stack and an electric current was supplied under a pressure of 0.98 MPa (10 kgf/cm$^2$) to measure the difference in potential between the two stainless steel sheets and to thereby calculate the electrical resistance. The resulting value was multiplied by the area of the contact surface and divided by the number of contact surface (=2) to determine the contact resistance. Samples with a contact resistance of 20 mΩ·cm$^2$ or less were rated good and samples with a contact resistance exceeding 20 mΩ·cm$^2$ were rated failure. Although the contact resistance can be improved by increasing the pressure during the measurement, the pressure was set to 0.98 MPa by considering the pressure of the actual environment.

Total Elongation

Two JIS 13B specimens stipulated in JIS Z 2201 were taken from each sample of the stainless steel sheets (the tensile direction was the rolling direction), and a tensile test was conducted at a strain rate of 10 mm/min. The average value of total elongation of two samples was determined. Samples with an average total elongation of 20% or more were rated good and those of less than 20% were rated failure.

Tables 2-1, 2-2, and 2-3 show that all Examples which have a composition that satisfies the range of the present invention and satisfy the requirements of the present invention in terms of the distribution density and size of the precipitates achieve both high conductivity and good ductility.

According to the present invention, stainless steel having good conductivity and ductility for use in fuel cells can be obtained and low-cost stainless steel separators can be provided to fuel cells, which use expensive carbon or gold-plated separators. Thus, spread of fuel cells can be accelerated.

TABLE 1

| Steel type | Chemical components (% by mass) | | | | | | | | | | | | Reference |
|---|---|---|---|---|---|---|---|---|---|---|---|---|---|
| | C | Si | Mn | P | S | Al | N | Cr | Mo | Nb | Ti | Zr | |
| A | 0.002 | 0.34 | 0.19 | 0.025 | 0.004 | 0.11 | 0.011 | 25.2 | 1.81 | 0.48 | — | — | Preferable steel |
| B | 0.004 | 0.24 | 0.16 | 0.026 | 0.002 | 0.11 | 0.006 | 30.2 | 1.97 | 0.17 | — | — | Preferable steel |
| C | 0.003 | 0.22 | 0.17 | 0.022 | 0.003 | 0.10 | 0.009 | 29.4 | 1.52 | — | 0.13 | — | Preferable steel |
| D | 0.004 | 0.15 | 0.23 | 0.022 | 0.004 | 0.08 | 0.007 | 30.0 | 1.89 | — | — | 0.18 | Preferable steel |
| E | 0.007 | 0.27 | 0.21 | 0.023 | 0.003 | 0.09 | 0.010 | 30.2 | — | 0.32 | — | — | Preferable steel |
| F | 0.004 | 0.22 | 0.18 | 0.022 | 0.004 | 0.09 | 0.009 | 25.6 | 1.28 | 0.28 | 0.11 | — | Preferable steel |
| G | 0.004 | 0.21 | 0.20 | 0.024 | 0.005 | 0.09 | 0.007 | 30.8 | 1.18 | — | 0.15 | 0.13 | Preferable steel |
| H | 0.004 | 0.18 | 0.19 | 0.023 | 0.004 | 0.08 | 0.009 | 30.1 | 1.58 | 0.02 | — | — | Preferable steel |
| I | 0.004 | 0.20 | 0.22 | 0.028 | 0.003 | 0.10 | 0.010 | 25.1 | 1.23 | — | 0.03 | — | Comparative steel |
| J | 0.003 | 1.12 | 0.20 | 0.024 | 0.003 | 0.09 | 0.010 | 29.8 | 1.52 | 0.15 | — | — | Comparative steel |
| K | 0.004 | 0.22 | 0.21 | 0.053 | 0.003 | 0.09 | 0.008 | 29.4 | 1.83 | 0.22 | — | — | Comparative steel |
| L | 0.003 | 0.24 | 0.18 | 0.026 | 0.004 | 0.31 | 0.009 | 30.1 | 1.78 | 0.19 | — | — | Comparative steel |
| M | 0.003 | 0.23 | 0.22 | 0.025 | 0.004 | 0.11 | 0.009 | 40.7 | 1.78 | 0.16 | — | — | Comparative steel |
| N | 0.004 | 0.25 | 0.15 | 0.024 | 0.005 | 0.09 | 0.008 | 30.3 | 4.08 | 0.17 | — | — | Comparative steel |
| O | 0.004 | 0.23 | 0.19 | 0.025 | 0.004 | 0.08 | 0.009 | 25.5 | 1.53 | 0.68 | — | — | Comparative steel |
| P | 0.003 | 0.21 | 0.18 | 0.022 | 0.004 | 0.09 | 0.008 | 25.1 | 1.29 | — | 0.61 | — | Comparative steel |
| Q | 0.004 | 0.19 | 0.20 | 0.023 | 0.005 | 0.09 | 0.008 | 30.6 | 1.84 | — | — | 0.62 | Comparative steel |

TABLE 2-1

| No | Steel type | t (μm) | −17.27 × ln(t) + 92 | R (° C./s) | Dmax (μm) | t/Dmax | Distribution density of precipitates (precipitates/ 100 μm²) | Contact resistance (mΩ · cm²) | Total elongation (%) | Reference |
|---|---|---|---|---|---|---|---|---|---|---|
| 1 | A | 50 | 24.4 | 5 | 4.8 | 15.6 | 4.9 | 9.7 | 15 | Comparative Example |
| 2 | | | | 20 | 2.8 | 17.9 | 4.5 | 10.3 | 18 | Comparative Example |
| 3 | | | | 50 | 2.0 | 25.0 | 3.1 | 12.5 | 22 | Example |
| 4 | | | | 100 | 1.8 | 27.8 | 0.8 | 21.3 | 24 | Comparative Example |
| 5* | | | | 50 | 3.9 | 12.8 | 5.2 | 8.6 | 13 | Comparative Example |
| 6 | | 100 | 12.5 | 5 | 5.2 | 19.2 | 4.9 | 7.8 | 16 | Comparative Example |
| 7 | | | | 20 | 2.7 | 37.0 | 4.4 | 10.0 | 23 | Example |
| 8 | | | | 50 | 2.1 | 47.6 | 3.0 | 12.7 | 25 | Example |
| 9 | | | | 100 | 1.8 | 55.6 | 0.8 | 21.1 | 28 | Comparative Example |
| 10 | B | 50 | 24.4 | 20 | 2.6 | 19.2 | 4.0 | 11.8 | 18 | Comparative Example |
| 11 | | | | 50 | 1.9 | 26.3 | 2.8 | 14.2 | 24 | Example |
| 12 | | | | 100 | 1.5 | 33.3 | 0.7 | 22.0 | 27 | Comparative Example |
| 13 | | 100 | 12.5 | 5 | 5.1 | 19.6 | 4.3 | 8.5 | 19 | Comparative Example |
| 14 | | | | 20 | 2.5 | 40.0 | 3.8 | 12.1 | 24 | Example |
| 15 | | | | 100 | 1.5 | 66.7 | 0.7 | 22.3 | 28 | Comparative Example |

*Sample (No. 5) with an asterisk was subjected to an aging treatment at 800° C. for 10 hours after cold-roll annealing.

TABLE 2-2

| No. | Steel type | t (μm) | −17.27 × ln(t) + 92 | R (° C./s) | Dmax (μm) | t/Dmax | Distribution density of precipitates (precipitates/ 100 μm²) | Contact resistance (mΩ · cm²) | Total elongation (%) | Reference |
|---|---|---|---|---|---|---|---|---|---|---|
| 16 | C | 50 | 24.4 | 20 | 2.9 | 17.2 | 3.8 | 11.5 | 17 | Comparative Example |
| 17 | | | | 50 | 2.3 | 21.7 | 2.7 | 13.4 | 21 | Example |
| 18 | | | | 100 | 2.1 | 23.8 | 0.9 | 20.9 | 24 | Comparative Example |
| 19 | | 100 | 12.5 | 5 | 5.2 | 19.2 | 4.2 | 9.4 | 18 | Comparative Example |
| 20 | | | | 20 | 2.8 | 35.7 | 3.8 | 11.8 | 23 | Example |
| 21 | | | | 100 | 2.2 | 45.5 | 0.9 | 20.7 | 28 | Comparative Example |
| 22 | D | 50 | 24.4 | 20 | 2.8 | 17.9 | 3.7 | 12.1 | 18 | Comparative Example |
| 23 | | | | 50 | 2.2 | 22.7 | 2.5 | 13.7 | 22 | Example |
| 24 | | 100 | 12.5 | 5 | 5.1 | 19.6 | 3.9 | 9.9 | 18 | Comparative Example |
| 25 | | | | 20 | 2.7 | 37.0 | 3.7 | 12.8 | 23 | Example |
| 26 | E | 50 | 24.4 | 20 | 2.7 | 18.5 | 4.2 | 11.6 | 18 | Comparative Example |
| 27 | | | | 50 | 2.0 | 25.0 | 3.0 | 12.9 | 24 | Example |
| 28 | | 100 | 12.5 | 5 | 5.2 | 19.2 | 4.5 | 8.8 | 19 | Comparative Example |
| 29 | | | | 20 | 2.6 | 38.5 | 4.0 | 11.9 | 24 | Example |
| 30 | F | 50 | 24.4 | 20 | 2.8 | 17.9 | 3.9 | 11.3 | 18 | Comparative Example |
| 31 | | | | 50 | 2.4 | 20.8 | 2.7 | 13.2 | 22 | Example |
| 32 | | 100 | 12.5 | 5 | 5.2 | 19.2 | 4.3 | 9.1 | 19 | Comparative Example |
| 33 | | | | 20 | 2.9 | 34.5 | 3.8 | 11.2 | 22 | Example |

TABLE 2-3

| No. | Steel type | t (μm) | −17.27 × ln(t) + 92 | R (° C./s) | Dmax (μm) | t/Dmax | Distribution density of precipitates (precipitates/ 100 μm²) | Contact resistance (mΩ · cm²) | Total elongation (%) | Reference |
|---|---|---|---|---|---|---|---|---|---|---|
| 34 | G | 50 | 24.4 | 20 | 2.9 | 17.2 | 3.7 | 11.5 | 17 | Comparative Example |
| 35 | | | | 50 | 2.4 | 20.8 | 2.8 | 13.4 | 23 | Example |
| 36 | | 100 | 12.5 | 5 | 5.1 | 19.6 | 4.1 | 9.2 | 18 | Comparative Example |
| 37 | | | | 20 | 2.7 | 33.3 | 3.7 | 11.8 | 22 | Example |
| 38 | H | 50 | 24.4 | 50 | 1.2 | 41.7 | 0.6 | 25.3 | 24 | Comparative Example |
| 39 | | | | 5 | 1.4 | 35.7 | 0.7 | 24.9 | 23 | Comparative Example |
| 40 | I | 50 | 24.4 | 50 | 1.4 | 35.7 | 0.6 | 25.1 | 23 | Comparative Example |
| 41 | J | 50 | 24.4 | 50 | 2.1 | 23.8 | 2.9 | 13.9 | 18 | Comparative Example |
| 42 | K | 50 | 24.4 | 50 | 2.0 | 25.0 | 2.8 | 14.0 | 17 | Comparative Example |
| 43 | L | 50 | 24.4 | 50 | 1.9 | 26.3 | 2.9 | 14.4 | 19 | Comparative Example |

TABLE 2-3-continued

| No. | Steel type | t (μm) | −17.27 × ln(t) + 92 | R (° C./s) | Dmax (μm) | t/Dmax | Distribution density of precipitates (precipitates/ 100 μm²) | Contact resistance (mΩ·cm²) | Total elongation (%) | Reference |
|---|---|---|---|---|---|---|---|---|---|---|
| 44 | M | 50 | 24.4 | 50 | 1.9 | 26.3 | 2.8 | 14.6 | 18 | Comparative Example |
| 45 | N | 50 | 24.4 | 50 | 2.2 | 22.7 | 3.0 | 13.7 | 19 | Comparative Example |
| 46 | O | 50 | 24.4 | 50 | 2.3 | 21.7 | 3.3 | 12.1 | 17 | Comparative Example |
| 47 | P | 50 | 24.4 | 50 | 2.6 | 19.2 | 3.2 | 11.9 | 16 | Comparative Example |
| 48 | Q | 50 | 24.4 | 50 | 2.6 | 20.8 | 3.2 | 12.2 | 17 | Comparative Example |

The invention claimed is:

1. A stainless steel sheet for use in a fuel cell separator, the stainless steel sheet having a composition of, in terms of % by mass:

C: 0.01% or less, Si: 1.0% or less, Mn: 1.0% or less, S: 0.01% or less, P: 0.05% or less, Al: 0.20% or less, N: 0.02% or less, Cr: 20 to 40%, Mo: 4.0% or less, and at least one selected from Nb, Ti, and Zr: 0.05 to 0.60% in total, the balance being Fe and unavoidable impurities, wherein at least one precipitate having an equivalent circle diameter of 0.1 μm or more is present per 100 μm², a ratio of a steel sheet thickness t (μM) to a maximum diameter Dmax (μm) of the precipitates satisfies formula (1) below $$20 \leq t/D\text{max} \tag{1}$$

and the steel sheet thickness is 200 μm or less.

2. A method for producing stainless steel for use in a fuel cell separator, the method comprising cooling a stainless steel cold-rolled sheet by controlling a cooling rate R (° C./s) relative to a thickness t (μm) at least down to 500° C. after annealing so that the cooling rate R satisfies formula (2) below, the stainless steel cold-rolled sheet having a thickness of 200 μm or less and having a composition of, in terms of % by mass, C: 0.01% or less, Si: 1.0% or less, Mn: 1.0% or less, S: 0.01% or less, P: 0.05% or less, Al: 0.20% or less, N: 0.02% or less, Cr: 20 to 40%, Mo: 4.0% or less, and at least one selected from Nb, Ti, and Zr: 0.05 to 0.60% in total, the balance being Fe and unavoidable impurities:

$$-17.27 \times \ln(t) + 92 \leq R \leq 70 \tag{2}$$

* * * * *